United States Patent
Schaefer-Enkeler et al.

(10) Patent No.: US 10,773,739 B2
(45) Date of Patent: Sep. 15, 2020

(54) METHOD, APPARATUS AND RAILROAD VEHICLE, IN PARTICULAR RAIL VEHICLE, FOR SIGNAL RECOGNITION IN RAILROAD TRAFFIC, IN PARTICULAR RAIL TRAFFIC

(71) Applicant: Siemens Mobility GmbH, München, Bayern (DE)

(72) Inventors: Andreas Schaefer-Enkeler, Röttenbach (DE); Andreas Schönberger, Bamberg (DE); Phillipp Von Rotenhan, Nürnberg (DE)

(73) Assignee: SIEMENS MOBILITY GMBH (DE)

( * ) Notice: Subject to any disclaimer, the term of this patent is extended or adjusted under 35 U.S.C. 154(b) by 0 days.

(21) Appl. No.: 16/091,540

(22) PCT Filed: Apr. 8, 2016

(86) PCT No.: PCT/EP2016/057804
§ 371 (c)(1),
(2) Date: Oct. 5, 2018

(87) PCT Pub. No.: WO2017/174155
PCT Pub. Date: Oct. 12, 2017

(65) Prior Publication Data
US 2019/0126957 A1 May 2, 2019

(51) Int. Cl.
*B61L 23/04* (2006.01)
*B61L 25/02* (2006.01)
(Continued)

(52) U.S. Cl.
CPC ............ *B61L 23/04* (2013.01); *B61L 3/004* (2013.01); *B61L 3/065* (2013.01); *B61L 23/041* (2013.01);
(Continued)

(58) Field of Classification Search
CPC .......... B61L 23/04; B61L 3/004; B61L 3/065; B61L 23/041; B61L 25/021;
(Continued)

(56) References Cited

U.S. PATENT DOCUMENTS

2011/0285842 A1* 11/2011 Davenport ............... B61L 23/04
348/116
2016/0007665 A1 1/2016 Austin

FOREIGN PATENT DOCUMENTS

| CN | 104554305 A | 4/2015 |
| CN | 105307919 A | 2/2016 |

(Continued)

OTHER PUBLICATIONS

Machine Translation of DE102011013009A1 (Year: 2011).*
(Continued)

*Primary Examiner* — Anne Marie Antonucci
*Assistant Examiner* — Andrew J Cromer
(74) *Attorney, Agent, or Firm* — Schmeiser, Olsen & Watts LLP

(57) ABSTRACT

Provided is an embodiment to automatically detect signals in track-bound traffic when track-bound vehicles are traveling on track sections in a track network. According to the embodiment, this is achieved in that on the basis of a) location-related reference information, which is stored as reference data and which is detected along the track section in the track network with respect to the geographical surroundings and the track-bound traffic signal control, in the form of reference location information, reference signal state information, context and notification information which is obtained in the context of the detection process, and optionally additional meta information relating to the information, and b) a comparison between the operational location information and operational signal state information,
(Continued)

Figure 1:
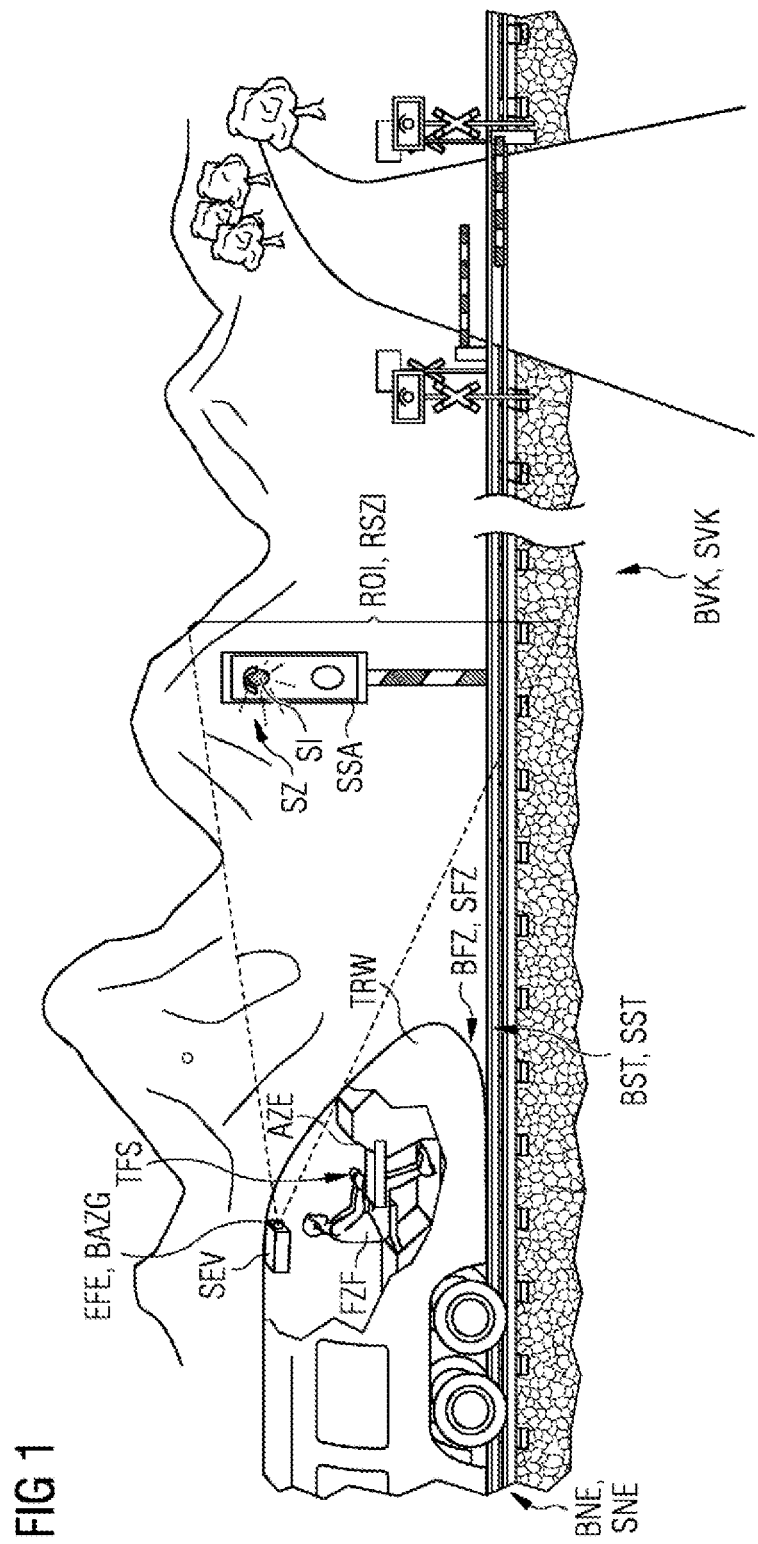

which is detected in the signal detection operation using position data, with the stored reference data, a signal and/or a signal state is detected in order to control the track-bound traffic on the track section.

41 Claims, 3 Drawing Sheets

(51) Int. Cl.
*B61L 3/06* (2006.01)
*B61L 3/00* (2006.01)
*G06T 7/246* (2017.01)
*B61L 27/00* (2006.01)

(52) U.S. Cl.
CPC ............ *B61L 25/021* (2013.01); *B61L 25/025* (2013.01); *B61L 27/0077* (2013.01); *B61L 27/0088* (2013.01); *B61L 27/0094* (2013.01); *G06T 7/246* (2017.01)

(58) Field of Classification Search
CPC ............... B61L 25/025; B61L 27/0077; B61L 27/0088; B61L 27/0094; B61L 29/00; B61L 3/008; B61L 3/227; B61L 2205/04; G06T 7/246

See application file for complete search history.

(56) References Cited

FOREIGN PATENT DOCUMENTS

| DE | 19538022 | C1 | | 1/1997 | |
|----|----------|----|----|--------|----|
| DE | 102011013009 | A1 | * | 9/2012 | ............ B61L 23/041 |
| DE | 102011013009 | A1 | | 9/2012 | |
| EP | 0893322 | A1 | | 1/1999 | |
| EP | 0893322 | B1 | * | 1/1999 | |
| KR | 20050120214 | A | | 12/2005 | |

OTHER PUBLICATIONS

PCT International Search Report corresponding to PCT International Application No. PCT/EP2016/057804.

Non-English Chinese Office Action for Application No. 201680086603.5, dated Jun. 8, 2020.

* cited by examiner

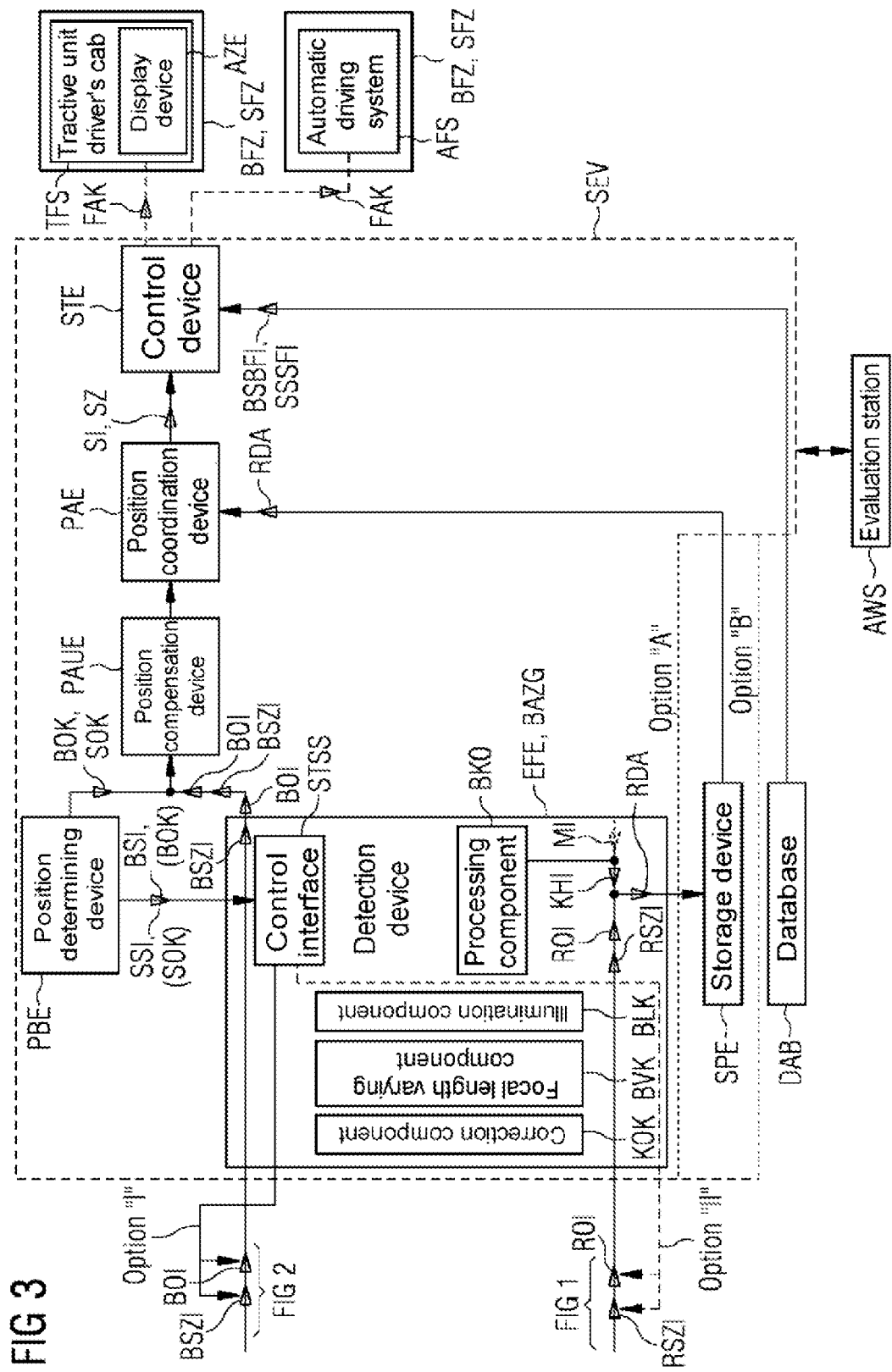

METHOD, APPARATUS AND RAILROAD VEHICLE, IN PARTICULAR RAIL VEHICLE, FOR SIGNAL RECOGNITION IN RAILROAD TRAFFIC, IN PARTICULAR RAIL TRAFFIC

CROSS-REFERENCE TO RELATED APPLICATIONS

This application claims priority to PCT Application No. PCT/EP2016/057804, having a filing date of Apr. 8, 2016, the entire contents of which are hereby incorporated by reference.

FIELD OF TECHNOLOGY

The following relates to a method for signal recognition in railroad traffic, an apparatus for signal recognition in railroad traffic, and a railroad vehicle for signal recognition in railroad traffic.

BACKGROUND

Railroad vehicles as part of a modern traffic infrastructure are track-bound traffic and transport means which move for example in rolling fashion on or beneath one or two guide rails (tracks), in levitating fashion above or below a magnetic field or in a manner suspended from steel cables. Of the track-bound traffic and transport means mentioned, the most widely used are rail vehicles which are based on a wheel-rail system, which either have their own propulsion drive (railcar) or are pulled or pushed by a locomotive and in which predominantly steel wheels are guided with a wheel flange on two steel rails or tracks.

Such rail vehicles in regional traffic or long-distance traffic, in contrast to driverless subways and railroads for linking airport terminals, rely on the fact that a tractive vehicle driver evaluates distant signals and main signals, such as e.g. line free signal or line occupied signal, and derives corresponding driving actions therefrom.

As a result, generally in the case of driver-operated railroad vehicles and in particular in the case of corresponding rail vehicles, the following scenarios can occur:

Scenario 1:
Tractive vehicle drivers, like all other human beings bearing responsibilities, are occasionally inattentive or make errors of perception and therefore possibly initiate highly dangerous driving actions (accelerating the vehicle) or fail to carry out driving actions (failing to carry out a braking operation in the vehicle).

Scenario 2:
Tractive vehicle drivers may not always be available (e.g. owing to illness, strike, unplanned increase in driving tasks, etc.), with the result that railroad journeys possibly have to be cancelled.

The occurrence of these scenarios outlined could be eliminated by automatic signal recognition, but the latter has failed hitherto on account of the following problems:

A. the state of signals has not been able to be recognized reliably, without producing a communication device between the section or signal box and the rail vehicle.
B. abnormal signals such as e.g. damaged signals or temporary signals for construction sites have not been able to be recognized.
C. relevant signals have not been able to be reliably differentiated from irrelevant signals (e.g. from a branch line or the opposite direction).

The cited problems in the implementation of automated signal recognition and corresponding driving influencing of the railroad vehicle or rail vehicle have hitherto been attempted to be tackled by expensive additional investment in the line infrastructure, such as induction loops, computers along the line and communication installations between train and line components. Corresponding solutions are therefore economic only on lines of manageable length, such as, for example, subways or railroads between airport terminals.

SUMMARY

An aspect relates to a method, an apparatus and a railroad vehicle, in particular a rail vehicle, for signal recognition in railroad traffic, in particular in rail traffic, wherein signals in railroad traffic, if railroad vehicles are travelling on railroad sections in the railroad network, are automatically recognized.

The concept underlying embodiments of the invention as claimed is that on the basis
(i) of location-related reference information stored as reference data, said information being detected along a railroad section in a railroad network in relation to geographical surroundings and railroad traffic signal control, in the form of reference location information and reference signal state information, context and indication information obtained in the detection context and, if appropriate, additional meta information in this regard, and
(ii) of the coordination of operation location information and operation signal state information detected in signal recognition operation on the basis of position data with the stored reference data, a signal and/or a signal state for controlling the railroad traffic on the railroad section are/is recognized, wherein as a result of evaluation of relevance and content of the information this is the case if, during the coordination, the detected operation signal state information for the signal recognition is found which in relation to the operation location information and the reference location information corresponding thereto corresponds to reference signal state information contained in the reference data taking account of the context and indication information contained in the reference data and the meta information that is possibly additionally present.

With the signal and/or signal state automatically recognized in this way, in an advantageous manner, at least one driving action can be calculated or derived taking account of stored railroad section and railroad vehicle information present as rail section and rail vehicle information in the case of rail vehicles and concerning railroad vehicle engineering or rail vehicle engineering regulations and railroad vehicle attributes and capabilities or rail vehicle attributes and capabilities. Said calculated or derived driving action can then be displayed to a vehicle driver in a tractive unit driver's cab of the railroad vehicle or rail vehicle as a recommendation on a display device, or be used as validation of a driving command, in order to support said driver's service activity. Alternatively, however, it is also possible to forward the calculated or derived driving action to an automatic driving system of the railroad vehicle or rail vehicle for automatically implementing the driving action (in the sense of "autonomous driving").

Furthermore, in an advantageous manner, in the case of dynamic signal control of the railroad traffic, if signal images with flashing portions are to be recognized, the signal recognition method for a determined position, e.g. a railroad location coordinate is repeated with a short time interval.

Conclusion:

What can be achieved by the intelligent coordination of operation location and signal state information detected in signal recognition operation with stored reference data is that signals along railroad sections are automatically recognized reliably without expensive infrastructure investment;

even abnormal signals e.g. on account of vandalism can be processed automatically;

the signals relevant to the railroad vehicle, in particular rail vehicle, in question can be differentiated from the irrelevant signals;

the method according to embodiments of the invention or the apparatus according to embodiments of the invention works better and better and ever more reliably over the course of time;

signals under unfavorable visibility conditions can be recognized more reliably than by a tractive vehicle driver in the known art; and tractive vehicle drivers are no longer required for driving, with the result that driving can be carried out independently of the availability of said drivers.

Further advantageous developments of embodiments of the invention are specified in the other dependent claims.

Thus for example if the operation location information detected for a determined position datum (e.g. railroad location coordinate or rail location coordinate) is altered for the compensation of inaccuracies in the detection, e.g. because the detection does not always happen at exactly the same place, of the reference location information in the stored reference data and the operation location information for the stated information coordination, by means of said information being distorted by technical measures.

Furthermore, it is advantageous for the signal recognition alongside the detected information and the information obtained in the detection context by assessment, use is also made of meta information literally concerning features or properties of the detected information and of the information obtained in the detection context by assessment and including corresponding data. With this meta information what can furthermore be specified is how the manner of signal control is carried out by means of generated calibration information from a signal control installation used for the signal control in relation to the signal installation type and signal installation states.

It is advantageous, moreover, if the reference data are generated statically in trial journeys or on the basis of targeted detection of the geographical surroundings and the signal control by the personnel of the railroad vehicle on the railroad section in the railroad network and are stored, and as the reference data already stored as are supplemented dynamically by the detected operation location information and the detected operation signal state information and are stored. The latter measure, in particular, makes it possible to achieve better and better and reliable signal recognition over the course of time.

Furthermore, it is advantageous if the statically generated reference data or the statically generated reference data and dynamically generated operation data supplemented with respect thereto are coordinated externally with corresponding data of other railroad vehicles of a common railroad vehicle fleet and are distributed for this purpose.

Furthermore, it is advantageous, in order to increase the confidence of the detected information (data obtained) and hence the recognition of signals, if two detection devices are used, e.g. in a signal recognition apparatus.

A particularly simple, cost-effective and efficient method for detecting the geographical surroundings and the signal control of the railroad traffic on the railroad section using an image recording appliance, configured for example as a customary video camera or infrared camera, pictorially, thus e.g. in the form of images of the surrounding landscape and of the signal installation, wherein the image recording appliance a) is configured in pivotable fashion.

b) has a correction component, which includes weather and brightness data in the evaluation of the image material.

c) has a focal length varying component, which chooses the correct capture angle depending on the distance with respect to the signal in order thus to optimally support the multiple evaluation of the signal. As a result, not only the distance with respect to the signal but also different capture situations can be taken into account. By way of example, both capture situations on a free line (require images from a large distance in order to be able to react in a timely manner on account of the speed) and capture situations in the region of the railroad station (require images having a great width) can then be handled in a suitable way.

d) has an illumination component, e.g. a spotlight, that operates within or outside the region visible to human beings. The quality of the image material captured by the image recording appliance at night or in poor weather is improved as a result.

BRIEF DESCRIPTION

Figure 2:
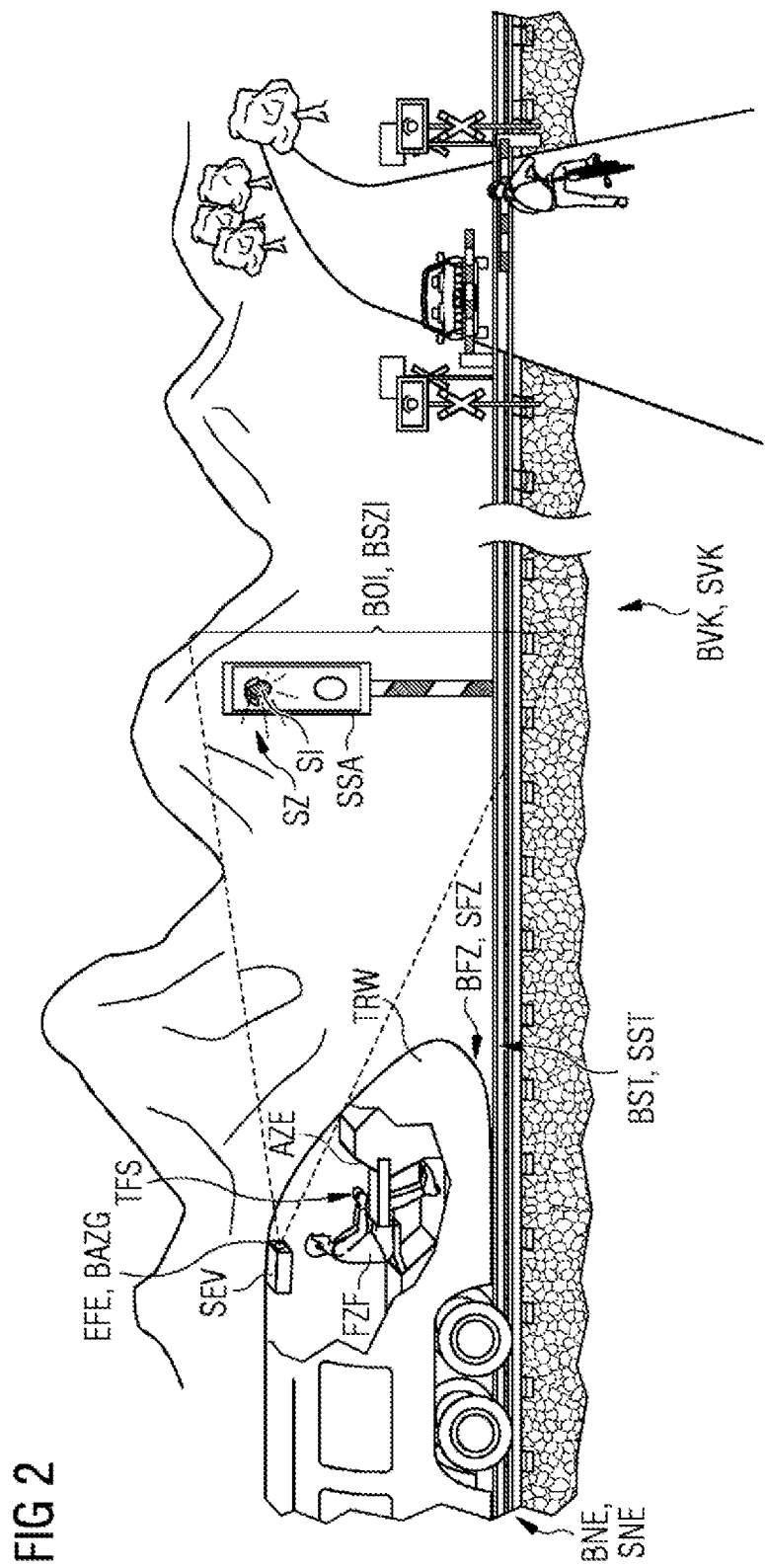

Some of the embodiments will be described in detail, with references to the following Figures, wherein like designations denote like members, wherein:

FIG. 1 in reference operation the detection of location-related reference information in railroad traffic relative to geographical surroundings and railroad traffic signal control on a partially illustrated railroad section of a railroad network by a signal recognition apparatus in a railroad vehicle in relation to a determined geographical position of the railroad vehicle on the railroad section;

FIG. 2 proceeding from FIG. 1 in signal recognition operation of the railroad vehicle on the portion of the railroad section of the railroad network with respect to a determined location coordinate of the railroad vehicle on said railroad section, the detection of operation location information in relation to the geographical surroundings and of operation signal state information in relation to the railroad traffic signal control by the signal recognition apparatus in the railroad vehicle; and FIG. 3 the basic construction of the signal recognition apparatus for recognizing signals and signal states of a signal control installation on the basis of the detected reference information in reference operation in accordance with FIG. 1 and the detected operation information in signal recognition operation in accordance with FIG. 2.

DETAILED DESCRIPTION

FIG. 1 shows the detection, as per in reference operation, of location-related reference information in railroad traffic BVK relative to geographical surroundings and railroad traffic signal control on a partially illustrated railroad section BST of a railroad network BNE by a signal recognition apparatus SVE in a railroad vehicle BFZ travelling on the railroad section BST and in relation to a determined geographical position of the railroad vehicle BFZ on the railroad section BST.

In accordance with the present exemplary embodiment, the railroad section BST of the railroad network BNE is a rail section SST of a rail network SNE on which a rail vehicle SFZ is travelling for the detection of the location-related reference information in rail traffic SVK. Instead of the illustrated rail traffic SVK with the rail vehicle SFZ travelling on the rail section SST of the rail network SNE, on the basis of the discussion given in the introduction, any other x-arbitrary long-distance-based railroad traffic system is also conceivable and imaginable as a further exemplary embodiment of the invention. Thus, by way of example, a magnetic levitation railroad traffic system (key words: Transrapid, Maglev, etc.) with a correspondingly comparable infrastructure, consisting of railroad network, railroad section and railroad vehicle, would likewise be appropriate.

In the rail traffic system illustrated in FIG. 1, the signal recognition apparatus SEV for detecting the location-related reference information is accommodated in a railcar TRW of the rail vehicle SFZ having a tractive unit driver's cab TFS and integrated display device AZE, in which the workstation of the vehicle driver FZF is situated. For this purpose, the signal recognition apparatus SEV includes a detection device EFE, which is preferably configured as an image recording appliance BAZG, e.g. as a customary video camera, infrared camera, etc.

By way of example, during a special journey of the rail vehicle SFZ on the rail section SST of the rail network SNE, said detection device EFE or the image recording appliance BAZG detects the location-related reference information in the form of reference location information ROI (also of FIG. 3) in relation to the geographical surroundings and reference signal state information RSZI (also cf. FIG. 3) in relation to the signal control of the rail traffic SVK on the illustrated portion of the rail section SST by means of a signal control installation SSA with regard to a road open to traffic crossing the rail section SST (grade crossing with barriers in FIG. 1). Detecting the reference signal state information involves essentially detecting a signal state SZ with a characteristic signal SI of the signal control installation SSA (automatic detection).

In accordance with the illustration in FIG. 1, the signal SI of the signal control installation SSA is not a temporally varying signal, e.g. a flashing signal, such as is used for dynamic signal control of the railroad traffic BVK, SVK, but rather a signal used to statically control the railroad traffic BVK, SVK. However, if signal images having flashing portions are to be recognized, then the signal recognition method according to embodiments of the invention is to be repeated for a determined railroad location coordinate as with a preferably short time interval.

However, the location-related reference information can also be generated in a manner other than by means of special journeys. Thus e.g. by means of correspondingly suitable rail-vehicle-independent recording methods or on the basis of targeted detection of the geographical surroundings and the signal control by the personnel of the railroad vehicle or of the rail vehicle on the railroad section or the rail section in the railroad network or the rail network (manual detection).

The detection of the reference location information and the reference signal state information of the signal control installation SSA is carried out for or in relation to a determined geographical position of the rail vehicle SFZ on the rail section SST, that is to say in a location-related manner, by corresponding activation of the detection device EFE or triggering of the image recording appliance BAZG as soon as the rail vehicle SFZ has substantially reached the ascertained and predefined position. The way in which this activation or triggering is carried out is explained in association with the description of FIG. 3.

In the case of the image recording appliance BAZG, therefore, after the triggering process, at least one image of the geographical surroundings and the signal control installation SSA is captured and as a result, alongside the geographical location information, the signal state SZ with the characteristic signal SI of the signal control installation SSA is detected pictorially, e.g. in the form of a plurality of images.

This location-related, preferably pictorial, detection can be carried out for different signal states SZ of the signal control installation SSA (e.g. in the case of a plurality of special journeys), whereby the amount of reference signal state information for the signal recognition increases and the recognition probability is thereby improved, under certain circumstances.

In the case of the image recording appliance BAZG, where at least one image in each case of the surrounding landscape and of the signal control installation is captured, the image recording appliance BAZG is advantageously configured in pivotable fashion in order to be able to compensate for the angle of the capture appliance with respect to the signal control installation SSA.

Furthermore, independently of whether the detection device EFE or the image recording appliance BAZG is accommodated in the railcar TRW of the rail vehicle SFZ, it is advantageous if more than one detection device EFE or image recording appliance BAZG is used. As a result, if e.g. one detection device EFE or one image recording appliance BAZG fails as a result of damage or contamination, the detection of the reference information can be continued in any case. Moreover, it is possible to increase the confidence of the detected reference information during parallel operation of e.g. two detection devices EFE or image recording appliances BAZG.

Further details of the signal recognition apparatus SEV comprising the detection device EFE or the image recording appliance BAZG, e.g. how this is configured in detail with regard to additional embodiments and the further processing and further handling, will be explained again in association with the description of FIG. 3.

In the manner described above, it is possible to detect all courses of railroad sections BST or rail sections in the railroad network BNE or rail network SNE at least partly and substantially in relation to geographical surroundings and traffic signal control on the railroad section BST or the rail section SST in a location-related manner in the form of reference location information and reference signal state information. As a result, an enormous pool of reference information is generated, which forms the basis of the signal recognition in railroad traffic BVK of the railroad network BNE.

This pool of information can generally be extended by arbitrary secondary information in order to optimize the signal recognition during regular driving operation of the individual railroad vehicle. This specific driving operation is referred to hereinafter as signal recognition operation.

Advantageous, practical secondary information that can be generated in an expedient manner will be specified and explained in association with the description of FIG. 3. Before that, however, signal recognition operation will also be described and explained with reference to FIG. 2.

FIG. 2 shows the detection, as per in signal recognition operation, of location-related operation information in railroad traffic BVK relative to geographical surroundings and railroad traffic signal control on the same railroad section BST of the railroad network BNE as illustrated in FIG. 1 likewise by means of the signal recognition apparatus SVE in the railroad vehicle BFZ travelling on the railroad section BST.

The railroad section BST of the railroad network BNE is e.g. once again as in FIG. 1 the rail section SST of the rail network SNE on which the rail vehicle SFZ is travelling for the detection of the location-related operation information in rail traffic SVK. Instead of the illustrated rail traffic SVK with the rail vehicle SFZ travelling on the rail section SST of the rail network SNE, on the basis of the discussion given in the introduction, any other x-arbitrary long-distance-based railroad traffic system is also appropriate as a further exemplary embodiment of the invention. Thus, by way of example, a magnetic levitation railroad traffic system (key words: Transrapid, Maglev, etc.) with a correspondingly comparable infrastructure, consisting of railroad network, railroad section and railroad vehicle, is once again also conceivable.

In the rail traffic system illustrated in FIG. 2, the signal recognition apparatus SEV for detecting the location-related operation information is accommodated in the railcar TRW of the rail vehicle SFZ having the tractive unit driver's cab TFS and the integrated display device AZE, in which the workstation of the vehicle driver FZF is situated. For this purpose, the signal recognition apparatus SEV once again has the detection device EFE, which is preferably configured as an image recording appliance BAZG, e.g. as a customary video camera, infrared camera, etc.

By way of example, during a regular operation journey of the rail vehicle SFZ on the rail section SST of the rail network SNE (e.g. as per schedule) with respect to a determined location coordinate of the rail vehicle SFZ on said rail section SST, said detection device EFE or the image recording appliance BAZG detects the location-related operation information in the form of operation location information BOI (also cf. FIG. 3) in relation to the geographical surroundings and operation signal state information BSZI (also of FIG. 3) in relation to the signal control of the rail traffic SVK on the illustrated portion of the rail section SST by means of the signal control installation SSA with regard to the road open to traffic crossing the rail section SST (grade crossing with barriers in FIG. 2). Detecting the operation signal state information involves essentially detecting a signal state SZ with a characteristic signal SI of the signal control installation SSA (automatic detection).

In accordance with the illustration in FIG. 2, the signal SI of the signal control installation SSA is not a temporally varying signal, e.g. a flashing signal, such as is used for dynamic signal control of the railroad traffic BVK, SVK, but rather a signal used to statically control the railroad traffic BVK, SVK. However, if signal images having flashing portions are to be recognized, then the signal recognition method according to embodiments of the invention is to be repeated for a determined railroad location coordinate as with a preferably short time interval.

The detection of the operation location information and the operation signal state information of the signal control installation SSA is carried out with respect to the determined location coordinate of the rail vehicle SFZ on the rail section SST, by corresponding activation of the detection device EFE or triggering of the image recording appliance BAZG as soon as the rail vehicle SFZ has reached the ascertained and predefined position. The way in which this activation or triggering is carried out is again explained in association with the description of FIG. 3.

In the case of the image recording appliance BAZG, therefore, after the triggering process, at least one image of the geographical surroundings and the signal control installation SSA is captured and as a result, alongside the geographical location information, the signal state SZ with the characteristic signal SI of the signal control installation SSA is detected pictorially, e.g. in the form of a plurality of images. In this case, once again the image recording appliance BAZG is advantageously configured in pivotable fashion in order to be able to compensate for the angle of the capture appliance with respect to the signal control installation SSA.

Furthermore, in signal recognition operation, too, as already previously in reference operation, independently of whether the detection device EFE or the image recording appliance BAZG is accommodated in the railcar TRW of the rail vehicle SFZ, it is advantageous if more than one detection device EFE or image recording appliance BAZG is used. As a result, if e.g. one detection device EFE or one image recording appliance BAZG fails as a result of damage or contamination, the detection of the operation information can be continued in any case. Moreover, it is possible to increase the confidence of the detected operation information during parallel operation of e.g. two detection devices EFE or image recording appliances BAZG.

Further details of the signal recognition apparatus SEV comprising the detection device EFE or the image recording appliance BAZG, e.g. how this is configured in detail with regard to additional embodiments and the further processing and further handling, will be explained again in association with the description of FIG. 3.

FIG. 3 shows the basic construction of the signal recognition apparatus SEV for recognizing the signals SI and signal states SZ of the signal control installation SSA as detected by the detection of the reference information in reference operation in accordance with FIG. 1 and the detection of the operation information in signal recognition operation in accordance with FIG. 2.

In this case, in accordance with the explanations concerning FIGS. 1 and 2, the starting point for this signal recognition is formed by the detection device EFE or the image recording appliance BAZG, which detects the reference location information ROI and the operation location information BOI in relation to the geographical surroundings and the reference signal state information RSZI and the operation signal state information BSZI in relation to the signal control installation SSA.

As described above in the explanation of FIGS. 1 and 2, the detection of the information in reference operation can preferably be carried out automatically, but also manually, while the detection of the information in signal recognition operation is preferably always carried out automatically. While in the case of manual detection the detection device EFE or the image recording appliance BAZG is manually activated or triggered, a corresponding external stimulus is needed in the case of automatic detection.

For this purpose, alongside the detection device EFE or the image recording appliance BAZG, the signal recognition apparatus SEV also has a position determining device PBE, which determines the geographical position of the railroad vehicle or rail vehicle on the travelled railroad section or rail section and the travelled railroad section or rail section. The way in which the position is determined is of secondary importance for explaining the exemplary embodiment of the invention and can be carried out in the routine manner generally known. Thus e.g. on the basis of a GPS-based system or a GPS-based technology.

With the position determining device PBE, a railroad location coordinate BOK, in particular a rail location coordinate SOK, can thus be determined, in particular in signal recognition operation, for every x-arbitrary location on the railroad section on which a railroad vehicle is movable. The position of the vehicle can be sufficiently specified by means of said railroad location coordinate BOK or rail location coordinate SOK.

With regard to the abovementioned stimulus or trigger for the detection device EFE or the image recording appliance BAZG, the position determining device PBE generates railroad section information BSI or rail section information SSI, which is fed to the detection device EFE or the image recording appliance BAZG for the purpose mentioned. The detection device EFE, BAZG has a control interface STSS for this purpose. With the railroad section information BSI or rail section information SSI, the detection device EFE, BAZG is controllable in such a way that it detects i) the operation location information BOI in relation to the geographical surroundings and the operation signal state information BSZI in relation to the railroad traffic signal control carried out by the signal control installation depending on the railroad section information BSI, SSI for the railroad location coordinate BOK communicated therein or the rail location coordinate SOK communicated therein (in the case of automatic detection in signal recognition operation; option "I") or ii) the operation location information BOI in relation to the geographical surroundings and the operation signal state information BSZI in relation to the railroad traffic signal control carried out by the signal control installation depending on the railroad section information BSI, SSI for the railroad location coordinate BOK communicated therein or the rail location coordinate SOK communicated therein, and the reference location information ROI in relation to the geographical surroundings and the reference signal state information RSZI in relation to the railroad traffic signal control carried out by the signal control installation depending on the railroad section information BSI, SSI for the geographical position of the railroad vehicle BFZ, SFZ that is communicated therein (in the case of automatic detection in signal recognition operation and reference operation; option "I" and option "II").

The detection device EFE, BAZG is preferably configured in such a way that the exact position and/or the angle of the detection of the geographical surroundings and the signal control of the railroad traffic on the railroad section relative to the railroad vehicle are/is taken into account for the assessment of the geographical surroundings and the rail traffic signal control in the detection context.

The detection device EFE, BAZG furthermore contains a processing component BKO, by which the geographical surroundings and the railroad traffic signal control, in particular the signal control installation, are assessed in the detection context and in particular provided with additional markings. For this purpose, the processing component BKO has for example a user interface (not explicitly illustrated in FIG. 3) via which the detected reference information, e.g. the captured images, is assessed by human experts, e.g. the vehicle driver, and the exact position of the signal control installation in the recorded image and the state thereof are marked.

As a result of the geographical surroundings and railroad traffic signal control, in particular of the signal control installation, that are assessed in the detection context and in particular provided with additional markings, the processing component BKO yields corresponding location-related context and indication information KHI.

Said location-related context and indication information KHI together with the reference location information ROI and the reference signal state information and, if appropriate, location- and detection-context-related meta information MI that is helpful for signal recognition and is provided by the detection device EFE, BAZG, form location-related reference data RDA, which are stored in a storage device SPE for the signal recognition.

The reference data RDA are preferably generated statically in special journeys or on the basis of targeted detection of the geographical surroundings and the signal control by the personnel of the railroad vehicle on the railroad section in the railroad network and are stored. The static detection of the stored reference data RDA can additionally be optimized in an advantageous manner by means of said static data being supplemented dynamically by the respectively detected operation location information BOI and the respectively detected operation signal state information BSZI and being stored.

As a location for storing the reference data RDA, the storage device SPE either (option "A") outside the signal recognition apparatus SEV, e.g. as storage database in the railcar, is assigned or connectable to the detection device EFE, BAZG or (option "B") as a component of the signal recognition apparatus SEV is correspondingly connected to the detection device EFE, BAZG.

The meta information MI is preferably optionally provided by the detection device EFE in order to recognize the signal states and the emitted signals of the signal control installation better and more reliably. As additional meta information it is possible to use e.g. the type of signal control installation and images (e.g. from a specific image laboratory) of different signal states of the respective signal control installation, which images are calibrated for the respective type of signal control installation. The meta information MI is very generally information literally concerning features or properties of the detected information and of the information obtained in the detection context by assessment, and it specifies how the manner of signal control is carried out by means of generated calibration information e.g. from the signal control installation SSA in relation to the signal installation type and signal installation states.

In the course of the exemplary embodiment of the invention, the image recording appliance BAZG, as a preferred configuration of the detection device EFE, BAZG, preferably for improving the detection of the reference location information ROI and the operation location information BOI in relation to the geographical surroundings and the reference signal state information RSZI and the operation signal state information BSZI in relation to the signal control installation SSA, also contains three further components, a correction component KOK, a focal length varying component BVK and an illumination component BLK.

With the correction component KOK, weather and brightness data are included in the evaluation of the image material.

With the focal length varying component BVK, depending on the distance with respect to the signal, the correct capture angle is chosen in order thus to optimally support the multiple evaluation of the signal. As a result, not only the distance with respect to the signal but also different capture situations can be taken into account. By way of example, both capture situations on a free line (require images from a large distance in order to be able to react in a timely manner on account of the speed) and capture situations in the region of the railroad station (require images having a great width) can then be handled in a suitable way.

With the illumination component BLK, which is configured as a spotlight, for example, which operates within or outside the range visible to human beings, the quality of the image material captured by the image recording appliance BAZG at night or in poor weather is improved.

Since above in the description of the signal recognition apparatus SEV in accordance with FIG. 3 taking account of the explanations concerning FIGS. 1 and 2 the functioning thereof has been explained in an introductory manner in relation to signal recognition operation and in detail in relation to reference operation, a description will be given below of how in signal recognition operation of the signal recognition apparatus SEV the signal recognition proceeds in detail on the basis of the operation information detected by the detection device EFE, BAZG.

The operation location information BOI and operation signal state information BSZI detected preferably in the form of a plurality of images of the geographical surroundings and the railroad traffic signal control, in particular of the signal control installation, captured in a manner spaced closely in time by the detection device EFE, BAZG on the basis of the operation location coordinate BOK, SOK determined by the position determining device PBE are fed together with the operation location coordinate BOK, SOK to a position compensation device PAUE. The position compensation device PAUE, which for the signal recognition is connected upstream of a position coordination device PAE, which carries out an information coordination between the operation information and the location-related reference information for the signal recognition, preferably alters the operation location information BOI detected for the determined railroad location coordinate BOK, SOK by the detection device EFE, BAZG for compensation of the detection inaccuracy of reference location information ROI and operation location information BOI for the information coordination. In this case, the alteration carried out in the position compensation device PAUE is brought about by technical distortion measures.

With regard to the images supplied by the image recording appliance BAZG, this means that possibly required distortions of the image material are determined if the present image material of the image database was not captured exactly at the same place as the images captured during the special journey. Consequently, as necessary, a position compensation of the captured images is calculated on the basis of the position information, i.e. the images are distorted somewhat, if appropriate.

The altered operation location information BOI and the operation signal state information BSZI are then passed or forwarded to the position coordination device PAE for the information coordination already mentioned. In said position coordination device PAE, the two pieces of operation information, the preferably altered operation location information BOI and the operation signal state information BSZI, are then coordinated with the location-related reference data RDA stored in the storage device SPE. This coordination is carried out in such a way that coordination of the operation location information BOI with the reference location information ROI and the operation signal state information BSZI with the reference signal state information RSZI in relation to the operation location information BOI and the reference location information ROI corresponding thereto is carried out on the basis of the stored reference data RDA in such a way that the detected operation signal state information BSZI for the signal recognition which is intended to recognize the signal SI and/or the signal state SZ for controlling the railroad traffic on the railroad section for the railroad location coordinate BOK, SOK determined is found if the operation signal state information BSZI in relation to the operation location information BOI and the reference location information ROI corresponding thereto corresponds to reference signal state information RSZI contained in the reference data RDA taking account of the context and indication information KHI contained in the reference data RDA or the context and indication information KHI and the meta information MI.

With regard to the images supplied by the image recording appliance BAZG, this means that the images captured during the regular operation journey are coordinated with the images assessed, e.g. by the expert or the vehicle driver, and marked and possibly the further metadata and calibration images in order to be able to recognize the signal and/or the signal state. In this case, the marking is used in order to define the relevant image segment as accurately as possible and also to be able to differentiate between relevant and irrelevant signals (e.g. from a branch line). If appropriate, distinctive image elements in the surroundings of the signal such as white signs are used for the color coordination.

Afterward, the recognized signal SI and/or the recognized signal state SZ are transferred to a control device STE of the signal recognition apparatus SVE. The control device STE is configured in such a way that it calculates or derives at least one driving action FAK from the signal SI and/or signal state SZ recognized by the position coordination device PAE and taking account of railroad section and railroad vehicle information BSBFI, preferably rail section and rail vehicle information SSSFI in the case of rail traffic, stored in a database DAB, which for example together with the storage device SPE forms a structural and functional unit, and concerning railroad vehicle engineering, in particular rail vehicle engineering, regulations and railroad vehicle attributes and capabilities, in particular rail vehicle attributes and capabilities.

Furthermore, the control device STE is configured in such a way that the calculated or derived driving action FAK is displayed to the vehicle driver FZF in the tractive unit driver's cab TFS of the railroad vehicle BFZ, SFZ as recommendation on the display device AZE, is used as validation of a driving command or is forwarded to an automatic driving system AFS of the railroad vehicle BFZ, SFZ for automatically implementing the driving action FAK.

The signal recognition apparatus SEV thus as described and explained above employed for reference and signal recognition operation in the railroad vehicle BFZ, SFZ and used for signal recognition is substantially composed of hardware and software components and can be integrated as a separately producible and sellable unit into an existing infrastructure of the railroad vehicle BFZ, SFZ.

In this state, the signal recognition apparatus SEV can be connected to an external evaluation station (AWS) and together with the external evaluation station AWS form a functional unit in such a way that the statically generated reference data RDA or the statically generated reference data RDA and dynamically generated operation data BOI, BSZI supplemented with respect thereto are coordinated externally with corresponding data of other railroad vehicles of a common railroad vehicle fleet and are distributed for this purpose.

The landside evaluation station AWS is preferably connected to the signal recognition apparatus SEV in the railroad vehicle BFZ, SFZ via mobile radio.

Furthermore, it is possible for the signal recognition apparatus SEV to be configured and function as a virtual machine in the sense of "Software Defined Signal Recognition of Rail Traffic Systems".

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for signal recognition in railroad traffic, comprising:
    a) collecting location-related information, at at least a part of courses of railroad sections detected in a railroad network, in relation to geographical surroundings and railroad traffic signal control on at least one railroad section in the form of location-related reference data comprising reference location information and reference signal state information, wherein the geographical surroundings and the railroad traffic signal control are assessed in a detection context, and
    b) storing the location-related reference data, which include with respect to the collected reference location information and reference signal state information, in addition, either location-related context and indication information obtained from the assessment or location-related context and indication information obtained from the assessment and location- and detection-context-related meta information,
    and in a signal recognition operation:
    c) determining, for every x-arbitrary location on the railroad section on which a railroad vehicle is movable, a railroad location coordinate with which the position of the vehicle is located,
    d) detecting, with respect to the respectively determined railroad location coordinate, operation location information in relation to the geographical surroundings and operation signal state information, in relation to a signal control installation for railroad traffic signal control,
    e) comparing the operation location information with the reference location information, and the operation signal state information with the reference signal state information in relation to the operation location information and the reference location information corresponding thereto, wherein the comparing is carried out on the basis of the stored location-related reference data such that the detected operation signal state information, which is intended to recognize a signal and/or a signal state for controlling the railroad traffic on the at least one railroad section for the railroad location coordinate determined, is found if the detected operation signal state information, in relation to the operation location information and the reference location information corresponding thereto, corresponds to reference signal state information contained in the located-related reference data, taking account of the context and indication information contained in the reference data or the context and indication information and the meta information.

2. The method as claimed in claim 1, wherein
    at least one driving action is calculated or derived from the recognized signal and/or signal state and taking account of stored railroad section and railroad vehicle information, concerning railroad vehicle engineering, regulations and railroad vehicle attributes and capabilities.

3. The method as claimed in claim 2, wherein
    the calculated or derived driving action(s) is/are displayed to a vehicle driver in a tractive unit driver's cab of the railroad vehicle as recommendation on a display device, is/are used as validation of a driving command or is/are forwarded to an automatic driving system of the railroad vehicle for automatically implementing the driving action.

4. The method as claimed in claim 1, wherein the operation location information detected for the railroad location coordinate determined is altered for the compensation of inaccuracies in the detection of reference location information and operation location information for the information coordination.

5. The method as claimed in claim 1, wherein a) there are detected the operation location information in relation to the geographical surroundings and the operation signal state information in relation to the railroad traffic signal control depending on railroad section information, for the railroad location coordinate communicated therein, or
    b) there are detected the operation location information in relation to the geographical surroundings and the operation signal state information in relation to the railroad traffic signal control depending on railroad section information for the railroad location coordinate communicated therein, and the reference location information in relation to the geographical surroundings and the reference signal state information in relation to the railroad traffic signal control depending on the railroad section information, for the geographical position of the railroad vehicle that is communicated therein.

6. The method of claim 5, wherein the railroad section information is rail section information.

7. The method as claimed in claim 1, wherein an exact position and/or the angle of the detection of the geographical surroundings and the railroad traffic signal control on the at least one railroad section relative to the railroad vehicle are/is taken into account for the assessment of the geographical surroundings and the rail traffic signal control in the detection context.

8. The method as claimed in claim 1, wherein
    with the meta information alongside information concerning literally features or properties of the detected information and of the information obtained in the detection context by the assessment, what is specified is how the manner of signal control is carried out by generated calibration information from the signal control installation in relation to signal installation type and signal installation states.

9. The method as claimed in claim 1, wherein the location-related reference data are generated statically in special journeys or on the basis of targeted detection of the geographical surroundings and the signal control by personnel of the railroad vehicle on the at least one railroad section in the railroad network and are stored.

10. The method as claimed in claim 9, wherein
the location-related reference data already stored are supplemented dynamically by the detected operation location information and the detected operation signal state information and are stored.

11. The method as claimed in claim 9 wherein the statically generated location-related reference data or the statically generated location-related reference data and dynamically generated operation data supplemented with respect thereto, are coordinated externally with corresponding location-related reference data of other railroad vehicles of a common railroad vehicle fleet and are distributed for this purpose.

12. An apparatus for signal recognition in railroad traffic, comprising
a) at least one detection device with which at least a part of courses of railroad sections in a railroad network are detectable in relation to geographical surroundings and railroad traffic signal control on at least one railroad section, wherein the at least one detection device is configured to collect, location-related reference data in the form of reference location information and reference signal state information, wherein the at least one detection device has a processing component configured to assess the geographical surroundings and the railroad traffic signal control in the detection context wherein
the location-related reference data are storable either in an apparatus-internal storage device connected to the at least one detection device including the processing component, or in an apparatus-external storage device connectable to the detection device including the processing component, which location-related reference data include, with respect to the reference location information and location-related reference signal state information in addition, either location-related context and indication information supplied by the processing component on the basis of an assessment or location-related context and indication information supplied by the processing component on the basis of the assessment and location- and detection-context-related meta information,
wherein
b) a position determining device, with which in a signal recognition operation, for every x-arbitrary location on the at least one railroad section on which a railroad vehicle is movable, a railroad location coordinate is determinable, with which the position of the vehicle is located,
wherein the at least one detection device is configured to detect operation location information in relation to the geographical surroundings and operation signal state information in relation to a signal control installation for railroad traffic signal control at the railroad location coordinate,
d) a position coordination device, which compares the operation location information with the reference location information and the operation signal state information with the reference signal state information in relation to the operation location information and the reference location information corresponding thereto, wherein the comparing is carried out on the basis of the stored reference data such that the detected operation signal state information which is intended to recognize a signal and/or a signal state for controlling the railroad traffic on the at least one railroad section for the railroad location coordinate determined, is found if the operation signal state information, in relation to the operation location information and the reference location information corresponding thereto, corresponds to reference signal state information contained in the location-related reference data taking account of the context and indication information contained in the reference data or the context and indication information and the meta information.

13. The method as claimed in claim 1, wherein the geographical surroundings and the railroad traffic signal control on the at least one railroad section are detected pictorially, in the form of images of the surrounding landscape and of the signal control installation.

14. The method as claimed in claim 1, further comprising repeating steps a) to e) with a time interval for the railroad location coordinate for dynamic signal control of the railroad traffic-, if signal images with flashing portions are to be recognized.

15. The method for signal recognition in railroad traffic of claim 1, wherein the reference location information and reference signal state information include images of the geographic surroundings and signal/and or signal state, wherein the images are marked such that the signal of the signal control installation are identified as relevant or irrelevant.

16. The method for signal recognition in railroad traffic of claim 1, further comprising storing at least one of:
an angle of detection of the detecting at least one reference location information and reference signal state information;
the marking of the exact position of the signal control installation and the signal state of the signal control installation; and
meta information, including the type of signal control installation and different signal states of the signal control installation.

17. The method as claimed in claim 1, wherein the geographical surroundings and the railroad traffic signal control assessed in the detection context are provided with additional markings.

18. The apparatus as claimed in claim 12, wherein two detection devices are contained in the signal recognition apparatus.

19. The apparatus as claimed in claim 18, further comprising a control device, which calculates or derives at least one driving action from the signal and/or signal state recognized by the position coordination device, and taking account of the at least one railroad section and railroad vehicle information stored in a database and concerning railroad vehicle engineering, regulations and railroad vehicle attributes and capabilities.

20. The apparatus as claimed in claim 19, wherein the control device is configured in such a way that the calculated or derived driving action is displayed to a vehicle driver in a tractive unit driver's cab of the railroad vehicle as a recommendation on a display device, and is used as validation of a driving command or is forwarded to an automatic driving system of the railroad vehicle for automatically implementing the driving action.

21. The apparatus as claimed in claim 18, further comprising a position compensation device, which is connected upstream of the position coordination device for the signal recognition and alters the operation location information detected for the determined railroad location coordinate by the detection device for the compensation of the detection inaccuracy of reference location information and operation location information for the information coordination, in particular by technical distortion measures.

22. The apparatus as claimed in claim 18, wherein the detection device has a control interface, via which the detection device receives railroad section information; from the position determining device and with which the detection device is controllable in such a way that the detection device detects
   a) the operation location information in relation to the geographical surroundings and the operation signal state information in relation to the railroad traffic signal control depending on the railroad section information for the railroad location coordinate communicated therein, or
   b) the operation location information in relation to the geographical surroundings and the operation signal state information in relation to the railroad traffic signal control depending on the railroad section information, for the railroad location coordinate communicated therein, and the reference location information in relation to the geographical surroundings and the reference signal state information in relation to the railroad traffic signal control depending on the railroad section information for the geographical position of the railroad vehicle that is communicated therein.

23. The apparatus as claimed in claim 18, wherein the detection device is configured in such a way that the exact position and/or the angle of the detection of the geographical surroundings and the signal control of the railroad traffic on the at least one railroad section relative to the railroad vehicle are/is taken into account for the assessment of the geographical surroundings and the railroad traffic signal control in the detection context.

24. The apparatus as claimed in claim 18, wherein the meta information alongside information concerning literally features or properties of the detected information and of the information obtained in the detection context by the assessment specifies how the manner of signal control is carried out by generated calibration information from the signal control installation in relation to signal installation type and signal installation states.

25. The apparatus as claimed in claim 18, wherein the detection device is configured in such a way that the location-related reference data are generated statically in special journeys or on the basis of targeted detection of the geographical surroundings and the signal control by personnel of the railroad vehicle on the at least one railroad section in the railroad network and are stored.

26. The method as claimed in claim 25, wherein
   the detection device is configured in such a way that the location-related reference data already stored are supplemented dynamically by the respectively detected operation location information and the respectively detected operation signal state information and are stored.

27. The apparatus as claimed in claim 12, wherein said apparatus is connected to an external evaluation station and together with the external evaluation station forms a functional unit in such a way that the statically generated reference data or the statically generated reference data and dynamically generated operation data supplemented with respect thereto are coordinated externally with corresponding data of other railroad vehicles of a common railroad vehicle fleet and are distributed for this purpose.

28. The apparatus as claimed in claim 18, wherein the detection device is configured as an image recording appliance which detects the geographical surroundings and the signal control of the railroad traffic on the railroad section pictorially in the form of images of the surrounding landscape and of the signal control installation.

29. The apparatus as claimed in claim 28, wherein the image recording appliance is configured in pivotable fashion.

30. The apparatus as claimed in claim 28, wherein the image recording appliance has a correction component, which includes weather and brightness data in the evaluation of the image material.

31. The apparatus as claimed in claim 28, wherein the image recording appliance has a focal length varying component, which chooses the correct capture angle depending on the distance with respect to the signal in order thus to optimally support the multiple evaluation of the signal.

32. The apparatus as claimed in claim 28, wherein the image recording appliance has an illumination component.

33. The apparatus as claimed in claim 32, wherein the illumination component is a spotlight that operates within or outside the range visible to human beings.

34. The apparatus as claimed in claim 18, wherein the apparatus is set up as a virtual machine.

35. A railroad vehicle for signal recognition in railroad traffic, an apparatus for signal recognition as claimed in claim 18 is integrated into the railroad vehicle.

36. The railroad vehicle of claim 16, wherein the railroad traffic is rail traffic.

37. A method for signal recognition in railroad traffic comprising:
   determining a railroad location coordinate for every x-arbitrary location on one or more railroad sections on which a railroad vehicle is movable such that the position of the railroad vehicle is determinable based on the railroad coordinate;
   detecting, at a railroad location coordinate on one or more railroad sections in a railroad network on which a railroad vehicle is moveable, at least one of reference location information including geographical surroundings of a signal control installation the one or more railroad sections, and reference signal state information including a signal and signal state of a signal control installation on the one or more railroad sections,
   wherein at the at least one of reference location information and reference signal state information are assessed to determine the exact position of the signal control installation and the signal state of the signal control installation, wherein the exact position and signal state are each marked; and
   storing the reference location information and reference signal state information, and storing at least one of location-related context and indication information obtained from the assessment or location-related context and indication information obtained from the assessment and location- and detection-context-related meta information.

38. The method for signal recognition in railroad traffic of claim 37, further comprising:
   detecting, at the railroad location coordinate, location-related operation information of the signal control installation, wherein the location-related operation information includes
      operation location information including the geographical surroundings of the signal control installation, and
      and operation signal state information including a detected signal state of the signal control installation; and recognizing at least one of the signal and signal state of the signal control installation by determining whether the operation signal state information and operation location information corresponds to the stored reference signal state information reference signal state information and reference location information, wherein the recognizing includes using at least one of the location-related context and indication information obtained from the assessment and location-related context and indication information obtained from the assessment and location- and detection-context-related meta information.

39. The method for signal recognition in railroad traffic of claim 38, wherein at least one of (a) the detection of reference location information and reference signal control state information and (b) location-related operation information is automatically performed based on a triggering event.

40. The method for signal recognition in railroad traffic of claim 39, wherein the triggering event occurs when the railroad vehicle arrives at a predetermined location on the railroad network.

41. A method for signal recognition in railroad traffic comprising:
   providing a storage device comprising reference location information including geographical surroundings of a signal control installation on one or more railroad sections in a railroad network, and reference signal state information including a signal and signal state of a signal control installation on the one or more railroad sections;
   comparing operation location information including the geographical surroundings of the signal control installation, and operation signal state information including a detected signal state of the signal control installation detected at the one or more railroad sections to the reference location information and reference signal state information;
   recognizing at least one of the signal and signal state of the signal control installation based on the comparing; and
   implementing a driving action of a railroad vehicle based on the recognized at least one of signal and signal state of the signal control installation.

* * * * *